United States Patent
Nijhawan et al.

(10) Patent No.: US 11,269,715 B2
(45) Date of Patent: Mar. 8, 2022

(54) SYSTEMS AND METHODS FOR ADAPTIVE PROACTIVE FAILURE ANALYSIS FOR MEMORIES

(71) Applicant: Dell Products L.P., Round Rock, TX (US)

(72) Inventors: Vijay Bharat Nijhawan, Austin, TX (US); Wade Andrew Butcher, Cedar Park, TX (US); Vadhiraj Sankaranarayanan, Austin, TX (US)

(73) Assignee: Dell Products L.P., Round Rock, TX (US)

(*) Notice: Subject to any disclaimer, the term of this patent is extended or adjusted under 35 U.S.C. 154(b) by 236 days.

(21) Appl. No.: 15/972,137

(22) Filed: May 5, 2018

(65) Prior Publication Data
US 2019/0340060 A1 Nov. 7, 2019

(51) Int. Cl.
*G06F 11/07* (2006.01)
*G06F 11/30* (2006.01)

(52) U.S. Cl.
CPC ........ *G06F 11/0793* (2013.01); *G06F 11/079* (2013.01); *G06F 11/0727* (2013.01); *G06F 11/0754* (2013.01); *G06F 11/3037* (2013.01)

(58) Field of Classification Search
CPC ............. G06F 11/0793; G06F 11/0727; G06F 11/0754; G06F 11/079
See application file for complete search history.

(56) References Cited

U.S. PATENT DOCUMENTS

| | | | | |
|---|---|---|---|---|
| 7,000,154 B1* | 2/2006 | LeDuc | ............... | G06F 11/0715 714/47.2 |
| 2002/0091965 A1* | 7/2002 | Moshayedi | .......... | G06F 11/004 714/6.13 |
| 2007/0174720 A1* | 7/2007 | Kubo | .................... | G06F 11/008 714/42 |
| 2007/0214255 A1* | 9/2007 | Spitz | ................... | H04L 41/0803 709/224 |
| 2010/0037044 A1* | 2/2010 | Yang | ..................... | G06F 9/4401 713/100 |
| 2011/0307758 A1* | 12/2011 | Fillingim | ............ | G06F 11/1048 714/758 |
| 2013/0179624 A1* | 7/2013 | Lambert | ............. | G06F 12/0246 711/103 |
| 2016/0202914 A1* | 7/2016 | Hsu | ......................... | G06F 3/061 714/49 |
| 2016/0224412 A1* | 8/2016 | Healy | ................. | G06F 11/1008 |
| 2016/0301428 A1* | 10/2016 | Andrade Costa | ... | G06F 11/1048 |
| 2019/0056994 A1* | 2/2019 | Shulkin | ................. | G11C 29/52 |

* cited by examiner

*Primary Examiner* — Kamini B Patel
(74) *Attorney, Agent, or Firm* — Jackson Walker L.L.P.

(57) ABSTRACT

In accordance with embodiments of the present disclosure, an information handling system may include a processor, a memory communicatively coupled to the processor and comprising a plurality of non-volatile memories, and a failure analysis module comprising a program of instructions, the failure analysis module configured to, when read and executed by the processor, set a predictive failure threshold for each of the plurality of non-volatile memories based at least on functional parameters of such non-volatile memory, and adapt the predictive failure threshold for each of the plurality of non-volatile memories based at least on health status parameters of such non-volatile memory.

15 Claims, 2 Drawing Sheets

SYSTEMS AND METHODS FOR ADAPTIVE PROACTIVE FAILURE ANALYSIS FOR MEMORIES

TECHNICAL FIELD

The present disclosure relates in general to information handling systems, and more particularly to systems and methods for adaptive proactive failure analysis for memories, including storage-class memories.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Non-volatile memory is often implemented in memory modules called non-volatile dual-inline memory modules (NVDIMMs), and NVDIMMs may be any of the following types: NVDIMM-N, NVDIMM-F, or NVDIMM-P. These memories bring persistence to the memory channel and can be used in a variety of modes: as a volatile memory, as a load-store byte addressable memory, or as a block device. While NVDIMM-N is implemented using a volatile memory (e.g., dynamic random access memory or DRAM) upon which a save operation is performed in response to a power failure to transfer data of the volatile memory to non-volatile memory for later recovery, NVDIMM-F and NVDIMM-P devices are non-DRAM based true storage class memories (SCMs) as they offer larger capacities and can be used as storage devices residing on the memory channel.

SCMs are expected to see increased use in coming server generations, as SCMs may bring orders of magnitude of performance improvement over solid-state drives and Non-Volatile Memory Express (NVMe) solutions for enterprise applications. SCMs may enable new usage modes, as an SCM may act as either a main system memory, a block device, or a persistent memory device. Although SCMs may bring persistence to the memory channel and a much higher density than the DRAM-based DIMMs, SCMs typically have longer access latencies and lower endurance levels than DRAMs.

One of the reasons for the low endurance levels on certain SCM memories (e.g., phase-change memories or PCMs) is due to the occurrence of high temperatures or heat generated in executing write operations. Hence, as memory cells in SCMs are repeatedly written, wear-out occurs gradually, and either a host controller or an on-DIMM controller needs to keep track of the number of writes for every block or sector, and resort to higher-level reliability, availability, and serviceability schemes such as wear-leveling for swapping worn out sectors to spares.

Because of the lower endurance and different electrical, thermal, and reliability characteristics than DRAM-based DIMMs, SCM memories are also typically expected to provide visibility on the overall health of the DIMM. A few of the health heuristics that may be provided include the amount of spare memory present, usage of spares beyond a pre-set threshold, number of correctable errors encountered while reading from the media, number of thermal events observed overall, and others.

On a DRAM-based volatile DIMM, write data from a host controller is written to DRAM cells directly and no correction capability exists in the DRAMs, although the Double-Data Rate 4 (DDR4) standard supports some detection capability in the form of write cyclic redundancy checks (CRCs). Similarly on read operations, data is read out from a DRAM cell array and sent to the host as is (although the DDR5 standard introduces on-die error correction code (ECC) on the read data for some data protection in the cell array). Write CRC and on-die ECC in their respective DDR standards are optional features, and may involve power/performance penalties. For instance, a vendor of servers may not use the write CRC feature in systems using the DDR4 standard, as it may involve a performance penalty on every write transaction. Hence, in such systems, errors on read data from volatile DIMMs at the host controller may be due to any of the following factors: memory controller logic/PHY, channel inter-symbol interference or system transients on write and read operations, DRAM or media related, buffer related, register clock driver related, and DIMM routing or noise.

Unlike a Joint Electron Device Engineering Council (JEDEC) standard DRAM-based volatile DIMM, SCMs can have intelligence built into their on-DIMM controller. Hence, there could be additional pipelines (or functionalities) on read and write data on the SCMs, unlike on DRAM-based DIMMs. For instance, there could be a write data ECC check as the data arrives at the SCM and an ECC generate/check on the SCM media itself for both read and write operations. Although it may be desirable that all SCMs be equipped with these reliability, availability, and serviceability features in their controllers to make the memory subsystem robust, it may not be practical to expect all types of SCMs to support all these features. For instance, an ECC check on incoming data requires knowledge on a processor ECC algorithm, and hence not all SCM providers may obtain that proprietary knowledge from a processor manufacturer. Similarly, a media ECC generate/check requires power and may incur a performance penalty, and hence a few SCMs may make this feature optional or disable the feature altogether.

SUMMARY

In accordance with the teachings of the present disclosure, the disadvantages and problems associated with existing approaches to failure analysis of memory in an information handling system may be reduced or eliminated.

In accordance with embodiments of the present disclosure, an information handling system may include a processor, a memory communicatively coupled to the processor and comprising a plurality of non-volatile memories, and a failure analysis module comprising a program of instructions, the failure analysis module configured to, when read and executed by the processor, set a predictive failure threshold for each of the plurality of non-volatile memories based at least on functional parameters of such non-volatile memory, and adapt the predictive failure threshold for each of the plurality of non-volatile memories based at least on health status parameters of such non-volatile memory.

In accordance with these and other embodiments of the present disclosure, a method may include, in an information handling system comprising a processor and a memory communicatively coupled to the processor and comprising a plurality of non-volatile memories, setting a predictive failure threshold for each of the plurality of non-volatile memories based at least on functional parameters of such non-volatile memory, and adapting the predictive failure threshold for each of the plurality of non-volatile memories based at least on health status parameters of such non-volatile memory.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system comprising a memory communicatively coupled to the processor and comprising a plurality of non-volatile memories, set a predictive failure threshold for each of the plurality of non-volatile memories based at least on functional parameters of such non-volatile memory and adapt the predictive failure threshold for each of the plurality of non-volatile memories based at least on health status parameters of such non-volatile memory.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
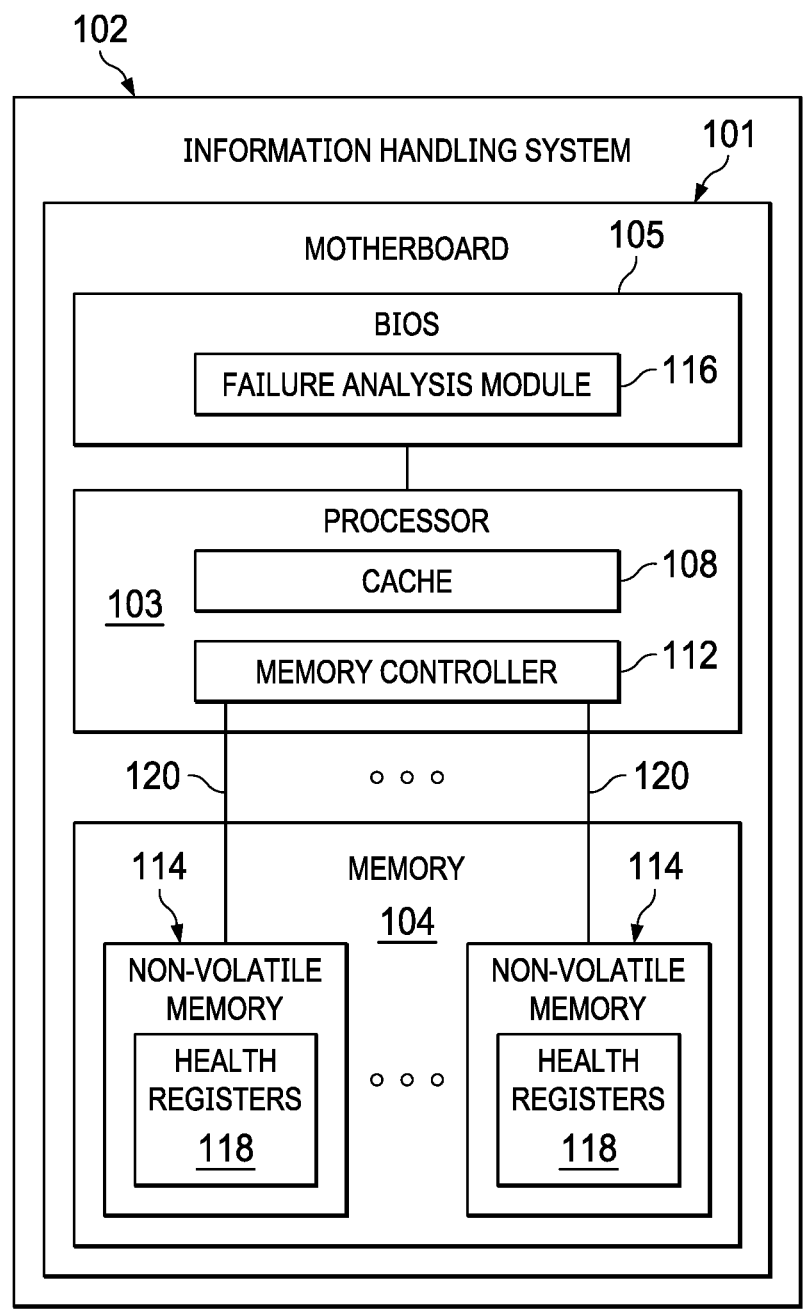
FIG. 1 illustrates a block diagram of an example information handling system, in accordance with embodiments of the present disclosure.
Figure 2:
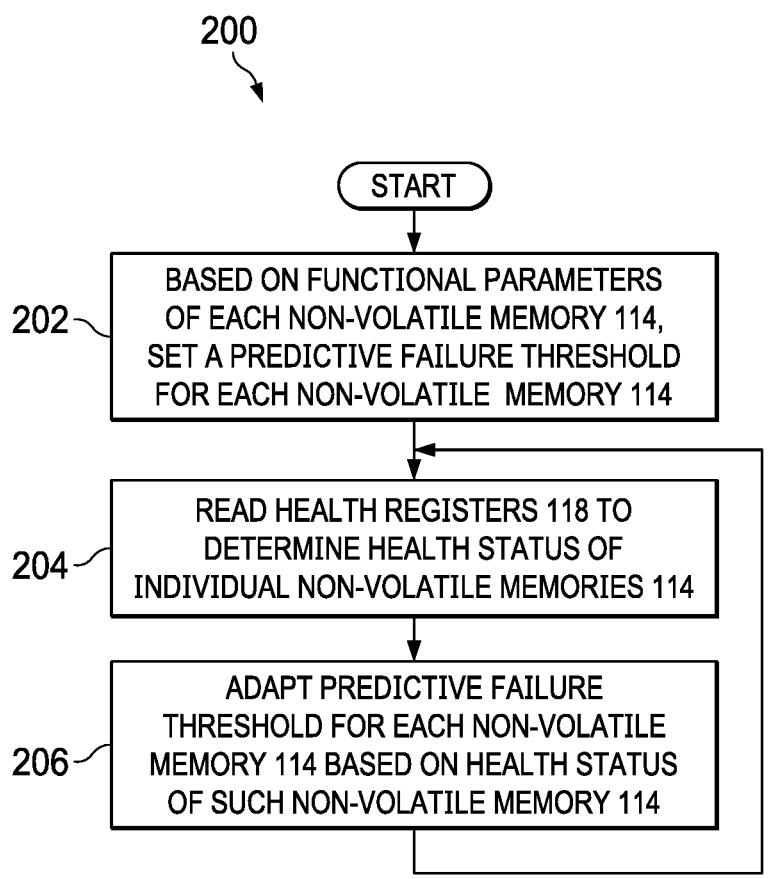
FIG. 2 illustrates a flow chart of an example method for adaptive proactive failure analysis of memories, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102, in accordance with embodiments of the present disclosure. As depicted, information handling system 102 may include a motherboard 101.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a BIOS 105, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102. As shown in FIG. 1, processor 103 may include a cache 108 and a memory controller 112.

Cache 108 may comprise a memory used by processor 103 to reduce the average time to access data from main memory 104. Cache 108 may be a smaller, faster memory than memory 104 and may store copies of frequently-used data and instructions from memory 104. In some embodiments, cache 108 may comprise an independent data cache and instruction cache. In these and other embodiments, a cache may be organized in a hierarchy of multiple cache levels (e.g., level 1, level 2, level 3, etc.). In these and other embodiments, cache levels within the hierarchy may be inclusive or exclusive. All or part of cache 108 may be configured as a write-back cache, in which processor 103 writes may be stored in cache 108 without also writing the data to memory 104, until a subsequent action such as cache line invalidate or flush operation forces the data to be written back to memory 104. Thus in write-back cache, the most up-to-date copy of the data may only reside in cache 108 indefinitely. Some part of cache 108 may also be configured as a write-through cache, in which processor 103 writes are stored in cache 108 but also immediately to memory 104 such that memory 104 has the most up-to-date copy of the data. In some embodiments, rather than configuring cache 108 itself, the cacheability of mutually-exclusive memory address ranges may be designated as write-back, write-through, or un-cacheable by having the BIOS 105 or an operating system mark the associated page tables for the address ranges of memory 104 accordingly during memory allocation. Reads from or writes to un-cacheable address ranges may not be stored in cache 108.

Memory controller 112 may be any system, device, or apparatus configured to manage and/or control memory 104. For example, memory controller 112 may be configured to read data from and/or write data to memory modules comprising memory 104. Additionally or alternatively, memory controller 112 may be configured to refresh memory modules and/or memory chips thereof in embodiments in which memory 104 (or a portion thereof) comprises DRAM. Although memory controller 112 is shown in FIG. 1 as an integral component of processor 103, memory controller 112 may be separate from processor 103 and/or may be an integral portion of another component of information handling system 102 (e.g., memory controller 112 may be integrated into memory 104).

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory 104 may comprise one or more non-volatile memories 114 (e.g., comprising one or more non-volatile dual-inline memory modules). As shown in FIG. 1, each non-volatile memory 114 may be coupled to memory controller 112 via a respective memory channel 120. In some embodiments, a non-volatile memory 114 may comprise a storage class memory (SCM) module.

As shown in FIG. 1, each non-volatile memory 114 may comprise one or more health registers 118 that set forth data indicative of health of a non-volatile memory 114, as described in greater detail below.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

As shown in FIG. 1, BIOS 105 may include a failure analysis module 116. Failure analysis module 116 may comprise any program of instructions that may be read and executed by processor 103, and when executed by processor 103, provides adaptive proactive failure analysis for non-volatile memories 114, as described in greater detail below.

In addition to motherboard 101, processor 103, memory 104, and BIOS 105, information handling system 102 may include one or more other information handling resources.

In operation, failure analysis module 116 of BIOS 105 may identify functional parameters associated with each non-volatile memory 114 and based on such functional parameters, set a predictive failure threshold for each non-volatile memory 114. Such functional parameters may include a memory type (e.g., phase-change memory, resistive memory, spin-transfer torque memory) of a non-volatile memory 114 and enabled operational features for such non-volatile memory 114. The table below lists examples of operational features that may be enabled on a non-volatile memory 114:

| Operational Features | Description |
| --- | --- |
| Only media, and no on-DIMM controller | DRAMs are simply replaced by higher-density media elements. Such SCM memories may take longer but provide predictable latencies for read/write operations than DRAM-based DIMMs. |
| Wear-leveling | An on-DIMM controller of non-volatile memory 114 provides only a wear-leveling feature, based on number of accesses to pages/blocks on the media. |
| ECC read/write on media data | An on-DIMM controller of non-volatile memory 114 provides ECC for read/write opeations on the media data, and supports wear-leveling based on the errors seen from the media. These DIMMs may require custom routing as all the DDR data is expected to be seen by the on-DIMM controller. |
| ECC Correction on DRAM write data, ECC read/write on media data, ECC Generation on read data to DRAM | An on-DIMM controller of non-volatile memory 114 perfoms ECC correction on incoming data, provides ECC for read/write operations on the media data, and generates ECC as recognized by the memory controller 112 on outgoing read data. |

The predictive failure threshold set by failure analysis module 116 responsive to the functional parameters associated with each non-volatile memory 114 may comprise any suitable threshold. For example, such predictive failure threshold may comprise a threshold for a "leaky bucket" algorithm, such that if a number of correctable errors associated with a non-volatile memory 114 exceeds such predictive failure threshold, failure analysis module 116 may generate an error or warning indicating a prediction that such non-volatile memory 114 is susceptible to failure (e.g., susceptible to generating an uncorrectable error).

After establishing the predictive failure threshold responsive to the functional parameters associated with each non-volatile memory 114, failure analysis module 116 may periodically adapt the predictive failure threshold for each non-volatile memory 114 based on health status parameters associated with such non-volatile memory 114. Such health status parameters may include, without limitation, a number of spare sectors of the non-volatile memory 114 remaining, occurrence of thermal excursions within the non-volatile memory 114 (e.g., number of times a temperature associated with the non-volatile memory 114 has exceeded a threshold temperature level), a number of correctable errors within media of the non-volatile memory 114 itself, and/or other parameters indicative of health.

In operation, failure analysis module 116 may periodically read health registers 118 to periodically ascertain the health of the various non-volatile memories 114. Such health registers 118 may store data indicative of health parameters associated with a non-volatile memory 114, such as those parameters set forth in the foregoing paragraph. For example, in some embodiments, such health registers 118 may indicate if any abnormalities on a non-volatile memory 114 as seen by a controller integral to the non-volatile memory 114 cross a threshold in a given duration and thus, may accurately indicate an immediate health status of the non-volatile memory 114. When such conditions occur, failure analysis module 116 may read such health registers 118 to determine the health status, adapt the predictive failure threshold based on such health status, and communicate an appropriate alarm or alert if the predictive failure threshold is exceeded.

FIG. 2 illustrates a flow chart of an example method 200 for adaptive proactive failure analysis of memories, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, failure analysis module 116 may identify functional parameters associated with each non-volatile memory 114, and based on such functional parameters, set a predictive failure threshold for each non-volatile memory 114. At step 204, failure analysis module 116 may read health registers 118 to determine the health status of individual non-volatile memories 114. At step 206, failure analysis module 116 may adapt the predictive failure threshold for each non-volatile memory 114 based on the health status of such non-volatile memory 114. After completion of step 206, method 200 may proceed again to step 204.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor;
a memory communicatively coupled to the processor and comprising a plurality of non- volatile memories; and
a failure analysis module comprising a program of instructions, the failure analysis module configured to, when read and executed by the processor:
set a predictive failure threshold for each of the plurality of non-volatile memories based at least on functional parameters of each respective non-volatile memory, wherein the predictive failure threshold of each respective non-volatile memory is a leaky-bucket threshold for such non-volatile memory, such that when a number of correctable errors associated with such non-volatile memory exceeds the predictive failure threshold, the failure analysis module is configured to generate an indication that such non-volatile memory is susceptible to failure, wherein the functional parameters include operational features that are enabled or not enabled by each respective non-volatile memory, the operational features including at least one error-correcting code (ECC) feature, such that the predictive failure threshold is dependent on whether or not each operational feature is enabled by each respective non-volatile memory, wherein a first non-volatile memory for which the at least one ECC feature is enabled has a different predictive failure threshold than a second non-volatile memory for which the at least one ECC feature is not enabled; and adapt the predictive failure threshold for each of the plurality of non-volatile memories based at least on health status parameters of each respective non-volatile memory.

2. The information handling system of claim 1, the failure analysis module further configured to:

read, from each of the plurality of non-volatile memories, a health status register associated with each respective non-volatile memory and indicative of the health status parameters of each respective non-volatile memory; and adapt the predictive failure threshold for each of the plurality of non-volatile memories based at least on information in the health status register of each respective non-volatile memory.

3. The information handling system of claim 1, wherein each of the plurality of non-volatile memories comprises a storage class memory.

4. The information handling system of claim 1, wherein the functional parameters of each respective non-volatile memory further comprise a memory type of each respective non-volatile memory.

5. The information handling system of claim 1, wherein the health status parameters of each respective non-volatile memory comprise at least one of a number of spare sectors of each respective non-volatile memory remaining, an occurrence of thermal excursions within each respective non-volatile memory, and a number of correctable errors within media of each respective non-volatile memory itself.

6. A method comprising, in an information handling system comprising a processor and a memory communicatively coupled to the processor and comprising a plurality of non-volatile memories:

setting a predictive failure threshold for each of the plurality of non-volatile memories based at least on functional parameters of each respective non-volatile memory, wherein the predictive failure threshold of each respective non-volatile memory is a leaky-bucket threshold for such non-volatile memory, such that when a number of correctable errors associated with such non-volatile memory exceeds the predictive failure threshold, the failure analysis module is configured to generate an indication that such non-volatile memory is susceptible to failure, wherein the functional parameters include operational features that are enabled or not enabled by each respective non-volatile memory, the operational features including at least one error-correcting code (ECC) feature, such that the predictive failure threshold is dependent on whether or not each operational feature is enabled by each respective non-volatile memory, wherein a first non-volatile memory for which the at least one ECC feature is enabled has a different predictive failure threshold than a second non-volatile memory the at least one ECC feature is not enabled; and adapting the predictive failure threshold for each of the plurality of non-volatile memories based at least on health status parameters of each respective non-volatile memory.

7. The method of claim 6, further comprising:

reading, from each of the plurality of non-volatile memories, a health status register associated with each respective non-volatile memory and indicative of the health status parameters of each respective non-volatile memory; and adapting the predictive failure threshold for each of the plurality of non-volatile memories based at least on information in the health status register of each respective non- volatile memory.

8. The method of claim 6, wherein each of the plurality of non-volatile memories comprises a storage class memory.

9. The method of claim 6, wherein the functional parameters of each respective non-volatile memory further comprise a memory type of each respective non-volatile memory.

10. The method of claim 6, wherein the health status parameters of each respective non-volatile memory comprise at least one of a number of spare sectors of each respective non-volatile memory remaining, an occurrence of thermal excursions within each respective non-volatile memory, and a number of correctable errors within media of each respective non-volatile memory itself.

11. An article of manufacture comprising:

a non-transitory computer-readable medium; and computer-executable instructions carried on the computer-readable medium, the instructions readable by a processor, the instructions, when read and executed, for causing the processor to, in an information handling system comprising a memory communicatively coupled to the processor and comprising a plurality of non-volatile memories:

set a predictive failure threshold for each of the plurality of non-volatile memories based at least on functional parameters of each respective non-volatile memory, wherein the predictive failure threshold of each respective non-volatile memory is a leaky-bucket threshold for such non-volatile memory, such that when a number of correctable errors associated with such non-volatile memory exceeds the predictive failure threshold, the failure analysis module is configured to generate an indication that such non-volatile memory is susceptible to failure, wherein the functional parameters include operational features that are enabled or not enabled by each respective non-volatile memory, the operational features including at least one error-correcting code (ECC) feature, such that the predictive failure threshold is dependent on whether or not each operational feature is enabled by each respective non-volatile memory, wherein a first non-volatile memory for which the at least one ECC feature is enabled has a different predictive failure threshold than a second non-volatile memory for which the at least one ECC feature is not enabled; and adapt the predictive failure threshold for each of the plurality of non-volatile memories based at least on health status parameters of each respective non-volatile memory.

12. The article of claim 11, the instructions for further causing the processor to:

read, from each of the plurality of non-volatile memories, a health status register associated with each respective non-volatile memory and indicative of the health status parameters of each respective non-volatile memory; and adapt the predictive failure threshold for each of the plurality of non-volatile memories based at least on information in the health status register of each respective non-volatile memory.

13. The article of claim 11, wherein each of the plurality of non-volatile memories comprises a storage class memory.

14. The article of claim 11, wherein the functional parameters of each respective non-volatile memory further comprise a memory type of each respective non-volatile memory.

15. The article of claim 11, wherein the health status parameters of each respective non-volatile memory comprise at least one of a number of spare sectors of each respective non-volatile memory remaining, an occurrence of thermal excursions within each respective non-volatile memory, and a number of correctable errors within media of each respective non-volatile memory itself.

* * * * *